US012424932B2

(12) United States Patent
Chin et al.

(10) Patent No.: US 12,424,932 B2
(45) Date of Patent: Sep. 23, 2025

(54) HIGH POWER FACTOR RECTIFIER CIRCUIT AND POWER CONVERTER

(71) Applicant: Huawei Digital Power Technologies Co., Ltd., Shenzhen (CN)

(72) Inventors: Ken Chin, Shenzhen (CN); Yuanjun Liu, Shenzhen (CN); Zhixiang Hu, Dongguan (CN); Wei Zhang, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 320 days.

(21) Appl. No.: 18/173,416

(22) Filed: Feb. 23, 2023

(65) Prior Publication Data

US 2023/0198383 A1     Jun. 22, 2023

Related U.S. Application Data

(63) Continuation of application No. PCT/CN2020/110762, filed on Aug. 24, 2020.

(51) Int. Cl.
 *H02M 1/42*     (2007.01)
 *H02M 1/00*     (2006.01)
 *H02M 1/44*     (2007.01)

(52) U.S. Cl.
 CPC ....... *H02M 1/4233* (2013.01); *H02M 1/0009* (2021.05); *H02M 1/44* (2013.01)

(58) Field of Classification Search
 CPC ..... H02M 1/0009; H02M 1/44; H02M 1/4233
 See application file for complete search history.

(56) References Cited

U.S. PATENT DOCUMENTS 6,388,429 B1 *    5/2002   Mao .......................... G05F 1/70
                                                    323/222
10,193,437 B1 *   1/2019   Hari ...................... H02M 7/217
                                  (Continued)

FOREIGN PATENT DOCUMENTS

CN       106685206 A      5/2017
CN       106704957 A      5/2017
                (Continued)

OTHER PUBLICATIONS

Fischer Guilherme Da Silva et al: "Extensions of Leading-Edge Modulated One-Cycle Control for Totem-Pole Bridgeless Rectifiers", IEEE Transactions on Power Electronics, Institute of Electrical and Electronics Engineers, USA, vol. 35, No. 5, Oct. 10, 2019 (Oct. 10, 2019), pp. 5447-5460, XP011774709.

*Primary Examiner* — Jue Zhang
*Assistant Examiner* — Lakaisha Jackson
(74) *Attorney, Agent, or Firm* — Conley Rose, P.C.

(57) ABSTRACT

A high power factor rectifier circuit includes a totem pole power factor correction (PFC) circuit, a sampling resistor, a power suppl a PFC controller, and a filter. The totem pole PFC circuit includes two bridge arm units connected in parallel between a first parallel connection point and a second parallel connection point. One end of the sampling resistor is connected to the first parallel connection point and a first reference ground, and the other end of the sampling resistor is separately connected to a sampling voltage input terminal of the PFC controller and a second reference ground. A grounding terminal of the PFC controller is connected to the first reference ground. A power output terminal of the power supply is connected to a power input terminal of the PFC controller using the filter.

20 Claims, 9 Drawing Sheets

(56) References Cited

U.S. PATENT DOCUMENTS

| | | | |
|---|---|---|---|
| 2007/0138971 A1* | 6/2007 | Chen | H05B 39/045 |
| | | | 315/209 R |
| 2016/0062428 A1* | 3/2016 | Zeng | G06F 1/26 |
| | | | 713/300 |
| 2017/0040899 A1* | 2/2017 | Ye | H02M 1/4225 |
| 2020/0106354 A1* | 4/2020 | Matsuura | H02M 1/4225 |
| 2022/0094262 A1* | 3/2022 | Jaksa | H02M 1/4233 |
| 2022/0255415 A1* | 8/2022 | Ishibashi | H02M 1/0009 |

FOREIGN PATENT DOCUMENTS

| | | | |
|---|---|---|---|
| CN | 107947570 A | 4/2018 | |
| CN | 109713918 A | 5/2019 | |
| CN | 110233564 A | 9/2019 | |
| JP | 2014042432 A | 3/2014 | |
| WO | WO-2020159640 A1 * | 8/2020 | H02M 1/0006 |

* cited by examiner

HIGH POWER FACTOR RECTIFIER CIRCUIT AND POWER CONVERTER

CROSS-REFERENCE TO RELATED APPLICATIONS

This is a continuation of International Patent Application No. PCT/CN2020/110762 filed on Aug. 24, 2020, the disclosure of which is hereby incorporated by reference in its entirety.

TECHNICAL FIELD

This disclosure relates to the field of electronic circuits, and in particular, to a high power factor rectifier circuit and a power converter.

BACKGROUND

High efficiency is one of main development trends of a power electronic converter. In conventional bridge power factor correction (PFC) (including two stages: a rectifier bridge and a boost PFC circuit), there are many conduction components, and efficiency is low. However, a totem pole PFC circuit can reduce a quantity of conduction components and improve efficiency. As shown in FIG. 1, an alternating current power supply $V_{AC}$ is connected to a totem pole PFC circuit, where the totem pole PFC circuit includes a boost inductor L0, switches S1, S2, S3, and S4, a filter capacitor C0, and a load Load. As shown in FIG. 1, it is assumed that the alternating current power supply $V_{AC}$ uses a reference direction in which an upper end represents a positive electrode and a lower end represents a negative electrode, where when the $V_{AC}$ has a positive voltage input, S2 and S4 are first closed, L0 is charged, then S2 is opened, S1 is closed, and an inductor current freewheels through S1, C0, the load Load, and S4; and when the $V_{AC}$ has a negative voltage input, S3 and S1 are first closed, L0 is charged, then S1 is opened, S2 is closed, and an inductor current freewheels through S3, C0, the load Load, and S2. To implement control on the totem pole PFC circuit, an inductor current flowing through the boost inductor in the totem pole PFC circuit usually needs to be sampled to control switches in the totem pole PFC circuit. Sampling of the inductor current in the conventional technology may be implemented by placing a current sensor near L0 in the totem pole PFC circuit. However, costs of the current sensor are high, and a volume of the circuit is large.

SUMMARY

This disclosure provides a high power factor rectifier circuit and a power converter, to reduce a volume of a circuit and reduce costs of inductor current sampling.

According to a first aspect, this disclosure provides a high power factor rectifier circuit. The high power factor rectifier circuit includes a totem pole power factor correction circuit, a sampling resistor, a power supply, a PFC controller, and a filter. The totem pole PFC circuit includes a first bridge arm unit and a second bridge arm unit that are connected in parallel between a first parallel connection point and a second parallel connection point. The first parallel connection point is connected to a first reference ground. One end of the sampling resistor is connected to the first parallel connection point, and the other end of the sampling resistor is separately connected to a sampling voltage input terminal of the PFC controller and a second reference ground. A grounding terminal of the PFC controller is connected to the first reference ground. A power output terminal of the power supply is connected to a power input terminal of the PFC controller by using the filter. A grounding terminal of the power supply is connected to the second reference ground. The power supply is configured to supply power to the PFC controller. The PFC controller is configured to control the totem pole PFC circuit based on a sampling current flowing through the sampling resistor.

In this disclosure, an inductor current is sampled based on the sampling resistor, to implement a small-volume and low-cost current sampling solution. In addition, the filter is connected between the power output terminal of the power supply and the power input terminal of the PFC controller, to reduce interactions between a current sampling loop and a power supply loop, and improve accuracy of current sampling.

With reference to the first aspect, in a first possible implementation, the totem pole PFC circuit further includes a boost inductor. The first bridge arm unit includes a first switch and a second switch that are connected in series with a first series connection point in a same direction, the second bridge arm unit includes a third switch and a fourth switch that are connected in series with a second series connection point in a same direction, and the boost inductor is connected to the first series connection point.

With reference to the first aspect or the first possible implementation of the first aspect, in a second possible implementation, the filter includes a first diode. A positive electrode of the first diode is connected to the power output terminal of the power supply, and a negative electrode of the first diode is connected to the power input terminal of the PFC controller.

In this disclosure, the first diode is connected between the power output terminal of the power supply and the power input terminal of the PFC controller, and the first diode may control a period of time during which a current flows through a power supply loop, to limit mutual coupling between the power supply and a sampling circuit within this period of time, thereby reducing interactions between the two circuits, and improving accuracy of current sampling.

With reference to the second possible implementation of the first aspect, in a third possible implementation, the filter further includes a first capacitor, where one end of the first capacitor is connected to a reference ground of the PFC controller, and the other end of the first capacitor is connected to the power input terminal of the PFC controller.

In this disclosure, the first capacitor is connected between the power input terminal of the PFC controller and the reference ground of the PFC controller. Therefore, while filtering a power supply input of the PFC controller and providing a transient current for the PFC controller, the first capacitor can control duration of a current flowing through the power supply loop, thereby improving accuracy of current sampling.

With reference to the first possible implementation of the first aspect, in a fourth possible implementation, the first switch and the second switch each include a metal-oxide-semiconductor field-effect transistor (MOSFET) or an insulated gate bipolar transistor (IGBT).

With reference to the first possible implementation of the first aspect, in a fifth possible implementation, the third switch and the fourth switch each include an MOSFET, an IGBT, or a diode.

With reference to the fourth possible implementation of the first aspect or the fifth possible implementation of the first aspect, in a sixth possible implementation, the first switch, the second switch, the third switch, and the fourth switch are made of a silicon semiconductor material (Si), or silicon carbide (SiC) or gallium nitride (GaN) of a third generation wide band gap semiconductor material.

According to a second aspect, this disclosure provides a power converter. The power converter includes the high power factor rectifier circuit according to any one of the first aspect to the sixth possible implementation of the first aspect and a direct current to direct current (DC/DC) converter. An input terminal of the foregoing high power factor rectifier circuit is connected to an alternating current power supply, and an output terminal of the high power factor rectifier circuit is connected to an output terminal of the power converter by using the DC/DC converter.

With reference to the second aspect, in a first possible implementation, the power converter further includes an electromagnetic compatibility (EMC) filter. One end of the EMC filter is connected to the alternating current power supply, and the other end of the EMC filter is connected to the input terminal of the high power factor rectifier circuit.

With reference to the second aspect or the first possible implementation of the second aspect, in a second possible implementation, the DC/DC converter is an isolated DC/DC converter, and a step-down ratio of the DC/DC converter is determined based on a voltage at the output terminal of the high power factor rectifier circuit and a voltage at the output terminal of the power converter.

In this disclosure, an inductor current is sampled by connecting the sampling resistor in the totem column PFC circuit, to reduce a volume of the circuit and reduce costs of inductor current sampling. In addition, the filter is connected between the power output terminal of the power supply and the power input terminal of the PFC controller, to reduce interactions between a current sampling loop and a power supply loop, and improve accuracy of current sampling.

DESCRIPTION OF EMBODIMENTS

A high power factor rectifier circuit provided in this disclosure is applicable to various alternating current to direct current (AC/DC) power converters or power converters. For example, the power converters or the power converters may include power supply adapters, chargers, or the like of various electronic devices. This is not limited herein. The foregoing electronic devices may be electronic products that operate based on electrical energy. For example, the various electronic devices may include a desktop computer, a laptop computer, a television, a game console, a smartphone, a personal digital assistant (PDA), a mobile Internet device (MID), an intelligent wearable device, and the like. This is not limited herein.

Figure 1:
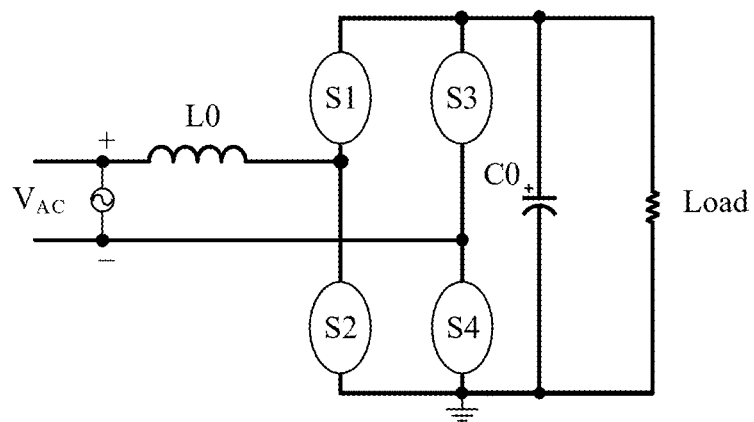
FIG. 1 is a schematic diagram of a structure of a totem pole PFC circuit.

Currently, research on a PFC technology in a power supply system develops towards a trend of high efficiency and high power density. A totem pole PFC circuit is proposed in compliance with this trend. As shown in FIG. 1, in a totem pole PFC circuit, when an input of a power supply $V_{AC}$ is a positive half-cycle of an alternating current, switches S2 and S4 are closed, and switches S1 and S3 are opened, so that a boost inductor L0 and the switches S2 and S4 can constitute an energy storage loop. After energy storage of the boost inductor L0 is completed, the switch S1 is closed, and the switch S2 is opened, so that the boost inductor L0 and the switches S1 and S4 constitute a freewheeling loop, to release energy on the boost inductor L0. When the input of the alternating current power supply $V_{AC}$ is a negative half-cycle of an alternating current, the switches S1 and S3 are closed, and the switches S2 and S4 are opened, so that the switches S3 and S1 and the boost inductor L0 can constitute an energy storage loop. After energy storage of the boost inductor L0 is completed, the switch S2 is closed, and the switch S1 is opened, so that the switches S3 and S2 and the boost inductor L0 constitute a freewheeling loop, to release energy on the boost inductor L0. It should be understood that, to ensure normal operation of the totem pole PFC circuit, a time sequence of the switches usually needs to be controlled to meet the foregoing correspondence. When the totem pole PFC circuit is in a discharging state or a freewheeling state, conversion from the discharging state or the freewheeling state to a charging state or an energy storage state may be implemented by obtaining a current flowing through the boost inductor in the totem pole PFC circuit. Therefore, without increasing costs of the circuit and increasing a volume of the circuit, sampling a current flowing through the boost inductor in the totem pole PFC circuit is an urgent problem to be resolved. For ease of description, in the following embodiments of this disclosure, the current flowing through the boost inductor in the totem pole PFC circuit is referred to as an inductor current.

Figure 2:
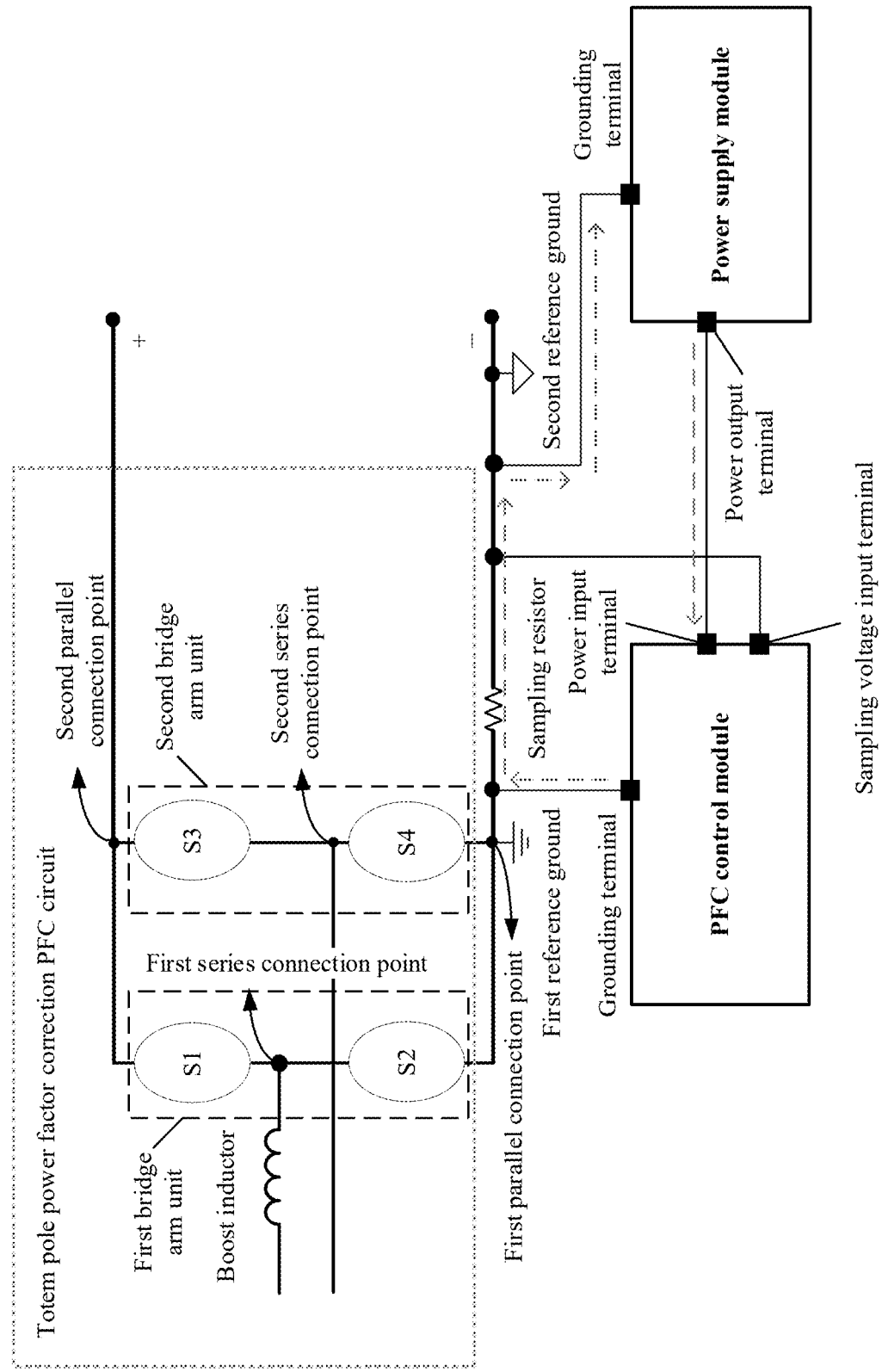
FIG. 2 is a schematic diagram of a structure of a high power factor rectifier circuit.

Based on this, in some feasible implementations, a low-cost and small-volume sampling resistor may be connected to the totem pole PFC circuit, to sample the inductor current in the totem pole PFC circuit. FIG. 2 is a schematic diagram of a structure of a high power factor rectifier circuit. As shown in FIG. 2, the high power factor rectifier circuit includes a totem pole PFC circuit, a sampling resistor, a power supply, and a PFC controller. The totem pole PFC circuit includes a boost inductor, a first bridge arm unit and a second bridge arm unit that are connected in parallel between a first parallel connection point and a second parallel connection point, where the first parallel connection point is connected to a first reference ground. Further, the first bridge arm unit includes a first switch S1 and a second switch S2 that are connected in series in a same direction, and the second bridge arm unit includes a third switch S3 and a fourth switch S4 that are connected in series in a same direction. A connection point between the first switch S1 and the second switch S2 is a first series connection point, and a connection point between the third switch S3 and the fourth switch S4 is a second series connection point. As shown in FIG. 2, the boost inductor is connected to the first series connection point. It should be understood that the first switch S1 and the second switch S2 each may be a MOSFET or an IGBT made of a material, for example, a S1 semiconductor material, or SiC or GaN of a third generation wide band gap semiconductor material. The third switch S3 and the fourth switch S4 may be MOSFETs, IGBTs, diodes, or the like made of a material, for example, S1, SiC, or GaN. This is not limited herein.

As shown in FIG. 2, one end of the sampling resistor is connected to the first parallel connection point, and the other end of the sampling resistor is separately connected to a sampling voltage input terminal of the PFC controller and a second reference ground. It should be understood that when the totem pole PFC circuit is in a discharging state or a freewheeling state, the boost inductor releases energy. In this case, a current flowing through the boost inductor in the totem pole PFC circuit is the same as a current flowing through the sampling resistor in the totem pole PFC circuit. Therefore, a discharging current in the inductor current or a current during freewheeling may be obtained by using the sampling resistor. It should be understood that the PFC controller may control, based on an obtained sampling current flowing through the sampling resistor, the totem pole PFC circuit to be converted from the discharging state (also referred to as the freewheeling state) to a charging state (also referred to as an energy storage state). Further, when an input of an alternating current power supply $V_{AC}$ is a positive half-cycle of an alternating current, and when the sampling current is less than or equal to a preset current threshold, the switches S2 and S4 are closed and the switches S1 and S3 are opened, so that the boost inductor and the switches S2 and S4 can constitute an energy storage loop. In this case, the boost inductor is charged, that is, the totem pole PFC circuit is in the charging state or the energy storage state. When the input of the alternating current power supply $V_{AC}$ is a negative half-cycle of an alternating current, and when the sampling current is less than or equal to the preset current threshold, the switches S1 and S3 are closed and the switches S2 and S4 are opened, so that the switches S3 and S1 and the boost inductor can constitute an energy storage loop. In this case, the boost inductor is charged, that is, the totem pole PFC circuit is in the charging state or the energy storage state.

As shown in FIG. 2, a power output terminal of the power supply is connected to a power input terminal of the PFC controller, and the power supply is configured to supply power to the PFC controller. A grounding terminal of the power supply is connected to the second reference ground, that is, a reference ground of the power supply is the second reference ground. A grounding terminal of the PFC controller is connected to the first reference ground, that is, a reference ground of the PFC controller is the first reference ground. It is not difficult to understand that, because the sampling resistor is spaced between the grounding terminal of the PFC controller and the grounding terminal of the power supply, a potential of the first reference ground is not equal to a potential of the second reference ground. When the power supply supplies power to the PFC controller, a power supply current starts from the power output terminal of the power supply, successively flows through the PFC controller and the sampling resistor, and finally flows back to the grounding terminal of the power supply. In other words, the power supply, the PFC controller, and the sampling resistor are in a same loop. The loop including the power supply, the PFC controller, and the sampling resistor is shown by dashed arrows in FIG. 2. It is not difficult to understand that a current flowing through the sampling resistor includes not only the inductor current in the totem pole PFC circuit, but also the power supply current. Therefore, a current actually sampled based on the sampling resistor is no longer equal to the inductor current. To be specific, an impact of the power supply causes inaccurate sampling of the inductor current, thereby affecting stable operation of the entire high power factor rectifier circuit.

Figure 3:
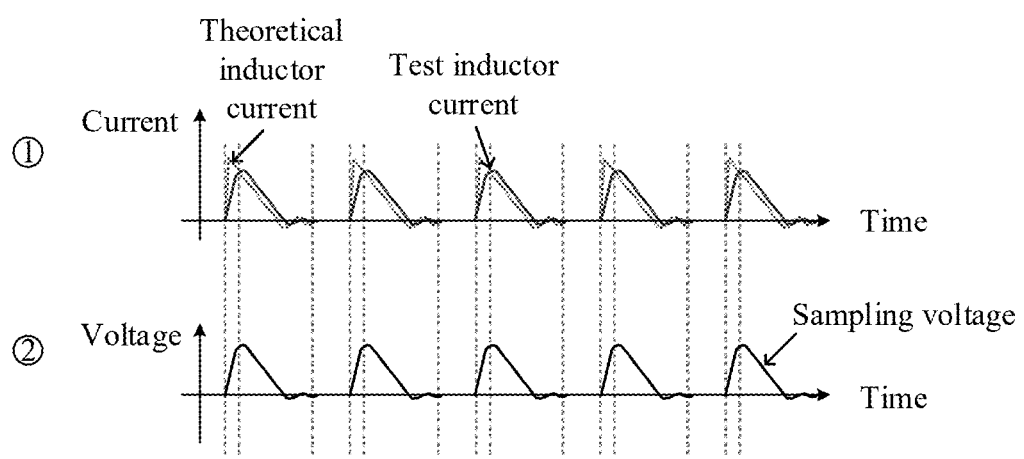
FIG. 3 is a schematic diagram of an inductor current sampling result when a high power factor rectifier circuit operates.

FIG. 3 is a schematic diagram of an inductor current sampling result when a high power factor rectifier circuit operates. As shown in FIG. 3, signal waveform diagrams in a coordinate axis $\hat{1}$ respectively represent an inductor current (namely, a theoretical inductor current) in an ideal state and an inductor current (namely, a test inductor current) determined in an actual sampling process. In other words, the theoretical inductor current in the coordinate axis $\hat{1}$ is a current that flows through the sampling resistor when there is no impact of a power supply current in the ideal state. The test inductor current in the coordinate axis $\hat{1}$ is a current that is determined based on a sampling voltage and that flows through the sampling resistor when the high power factor rectifier circuit shown in FIG. 2 operates and an impact of the supply current exists. Signal waveform diagrams in a coordinate axis $\hat{2}$ are signal waveforms of a sampling voltage that is fed back by the sampling resistor to a sampling voltage input terminal of the PFC controller when the high power factor rectifier circuit shown in FIG. 2 operates. It should be understood that the sampling voltage in the foregoing coordinate axis $\hat{2}$ and the test inductor current in the coordinate axis $\hat{1}$ meet the Ohm's law, that is, the test inductor current=the sampling voltage/a resistance value of the sampling resistor. It can be learned from FIG. 3 that the impact of the power supply current of the power supply causes an inaccurate result of inductor current sampling, that is, a signal waveform of the test inductor current does not coincide with a signal waveform of the theoretical inductor current.

In view of this, another high power factor rectifier circuit is provided in this disclosure to resolve the problem that an inaccurate inductor current is sampled when current sampling is performed by using the sampling resistor. The high power factor rectifier circuit provided in this disclosure is described in detail with reference to FIG. 4 to FIG. 10.

Figure 4:
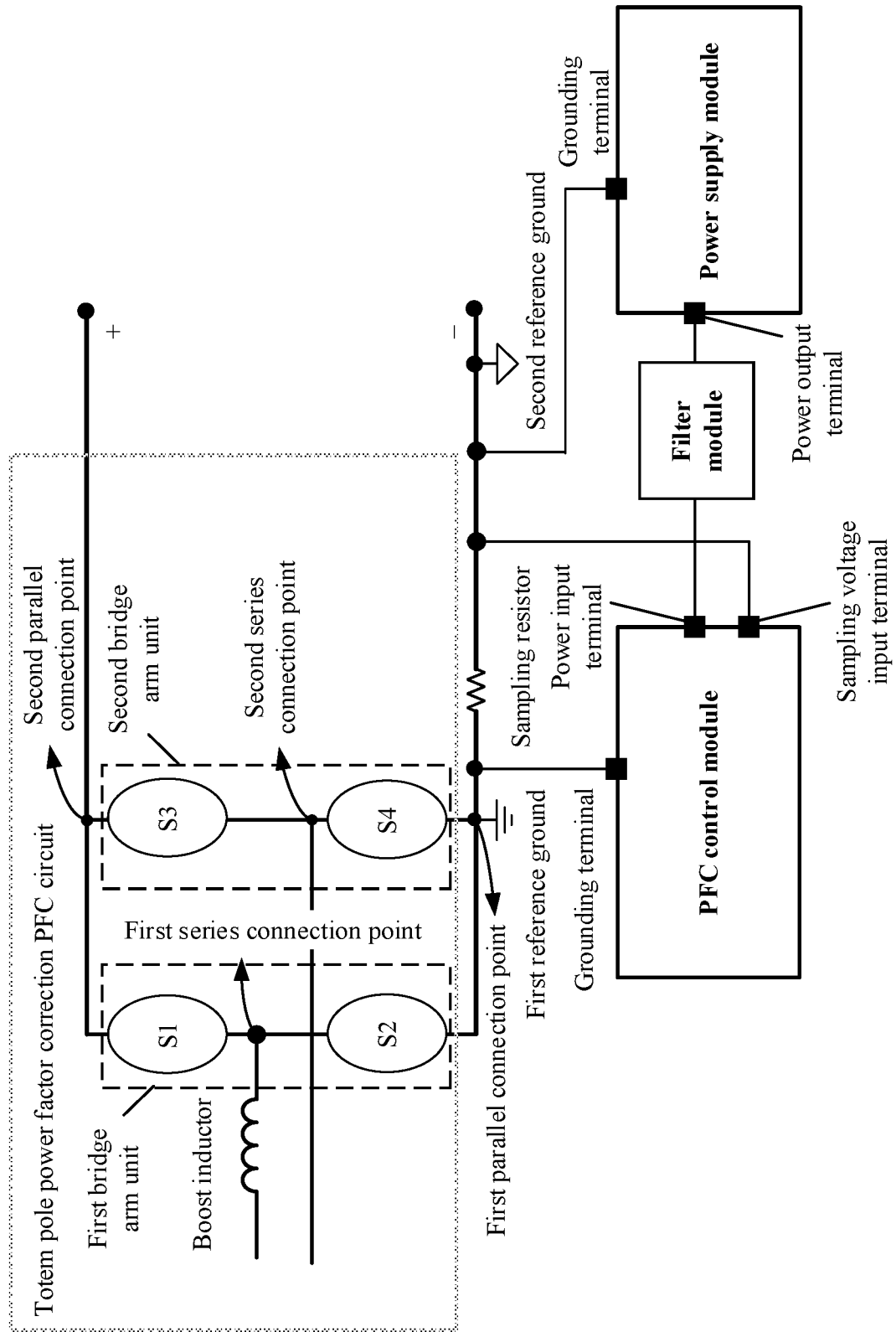
FIG. 4 is a schematic diagram of a structure of a high power factor rectifier circuit according to this disclosure.

FIG. 4 is a schematic diagram of a structure of the high power factor rectifier circuit provided in this disclosure. As shown in FIG. 4, the high power factor rectifier circuit includes a totem pole PFC circuit, a sampling resistor, a power supply, a PFC controller, and a filter. The totem pole PFC circuit includes a first bridge arm unit and a second bridge arm unit that are connected in parallel between a first parallel connection point and a second parallel connection point, where the first parallel connection point is connected to a first reference ground. Further, the first bridge arm unit includes a first switch S1 and a second switch S2 that are connected in series in a same direction, and the second bridge arm unit includes a third switch S3 and a fourth switch S4 that are connected in series in a same direction. A connection point between the first switch S1 and the second switch S2 is a first series connection point, and a connection point between the third switch S3 and the fourth switch S4 is a second series connection point. As shown in FIG. 4, an alternating current power supply and a boost inductor are connected between the first series connection point between the first switch S1 and the second switch S2 and the second series connection point between the third switch S3 and the fourth switch S4. It should be understood that the first switch S1 and the second switch S2 may be MOSFETs or IGBTs made of a material, for example, Si, SiC, or GaN. The third switch S3 and the fourth switch S4 may be MOSFETs, IGBTs, diodes, or the like made of a material, for example, Si, SiC, or GaN. This is not limited herein.

As shown in FIG. 4, one end of the sampling resistor is connected to the first parallel connection point, and the other end of the sampling resistor is separately connected to a sampling voltage input terminal of the PFC controller and a second reference ground. A power output terminal of the power supply is connected to a power input terminal of the PFC controller by using the filter. A grounding terminal of the power supply is connected to the second reference ground, and a grounding terminal of the PFC controller is connected to the first reference ground. The power supply is configured to supply power to the PFC controller. The PFC controller is configured to control on and off of each switch in the totem pole PFC circuit based on a sampling current flowing through the sampling resistor. As shown in FIG. 4, in this embodiment of this disclosure, the filter is connected between the power output terminal of the power supply and the power input terminal of the PFC controller. The filter may control a period of time during which a current flows through a power supply loop, to limit mutual coupling between the power supply and a sampling circuit within this period of time, thereby reducing interactions between the two circuits, and improving accuracy of current sampling.

Figure 5:
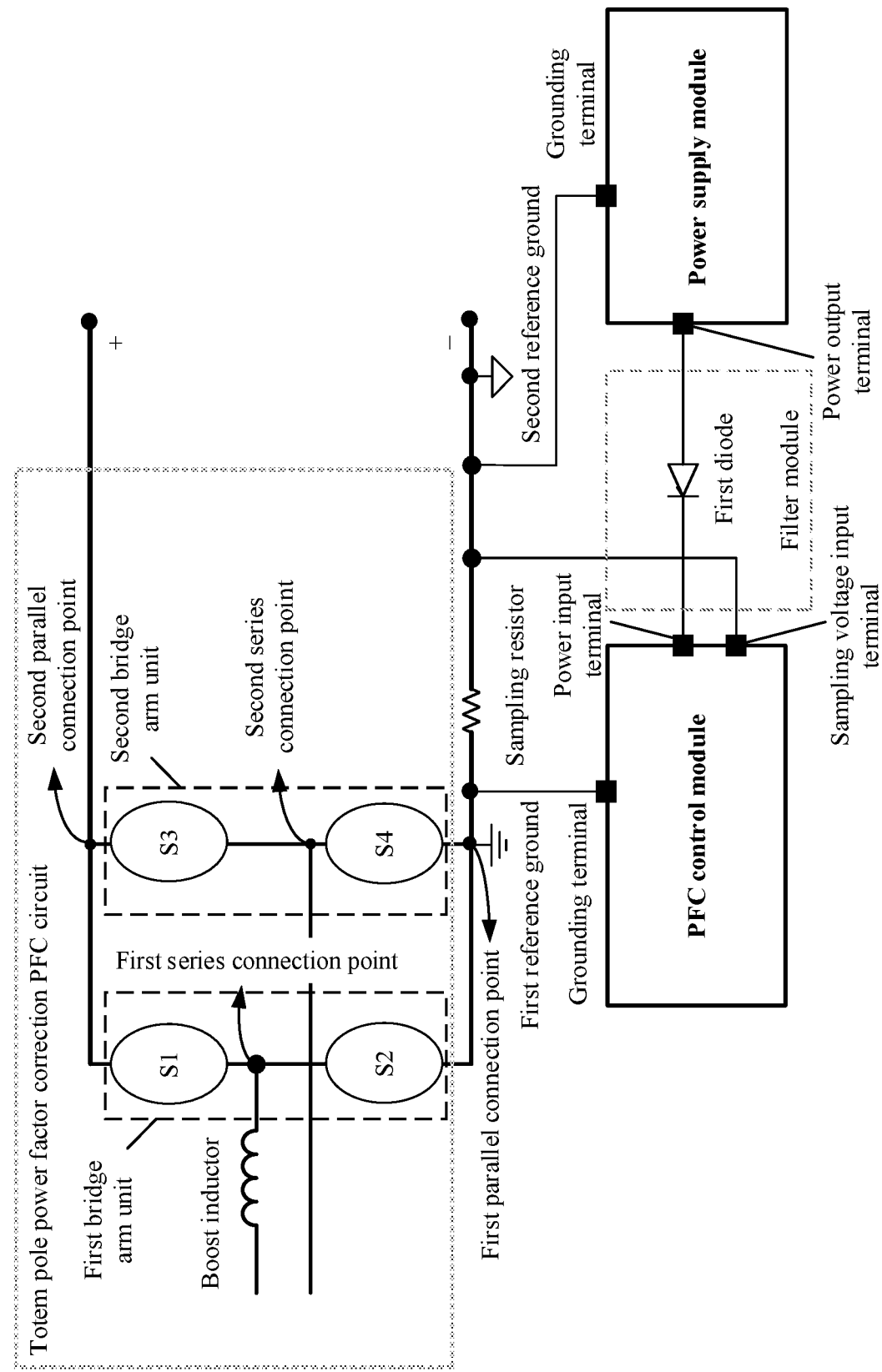
FIG. 5 is a schematic diagram of another structure of a high power factor rectifier circuit according to this disclosure.

Further, in some feasible implementation, the filter may include one diode (for ease of description, the following uses a first diode as an example for description). FIG. 5 is a schematic diagram of another structure of the high power factor rectifier circuit provided in this disclosure. As shown in FIG. 5, a positive electrode (also referred to as an anode) of the first diode is connected to the power output terminal of the power supply, and a negative electrode (also referred to as a cathode) of the first diode is connected to the power input terminal of the PFC controller. It should be understood that, after the first diode is connected between the power output terminal of the power supply and the power input terminal of the PFC controller, the filter can control a period of time during which a current flows through the power supply loop, to limit the mutual coupling between the power supply and the sampling circuit within this period of time. In this way, an input voltage at the power input terminal of the PFC controller becomes stable. In addition, because of a forward conductivity of the diode (to be specific, a current can only flow in from the positive electrode of the diode and flow out of the negative electrode of the diode), when and only when an output voltage at the power output terminal of the power supply is greater than the input voltage at the power input terminal of the PFC controller, a power supply current flows through a loop including the power supply, the PFC controller, and the sampling resistor.

Figure 6:
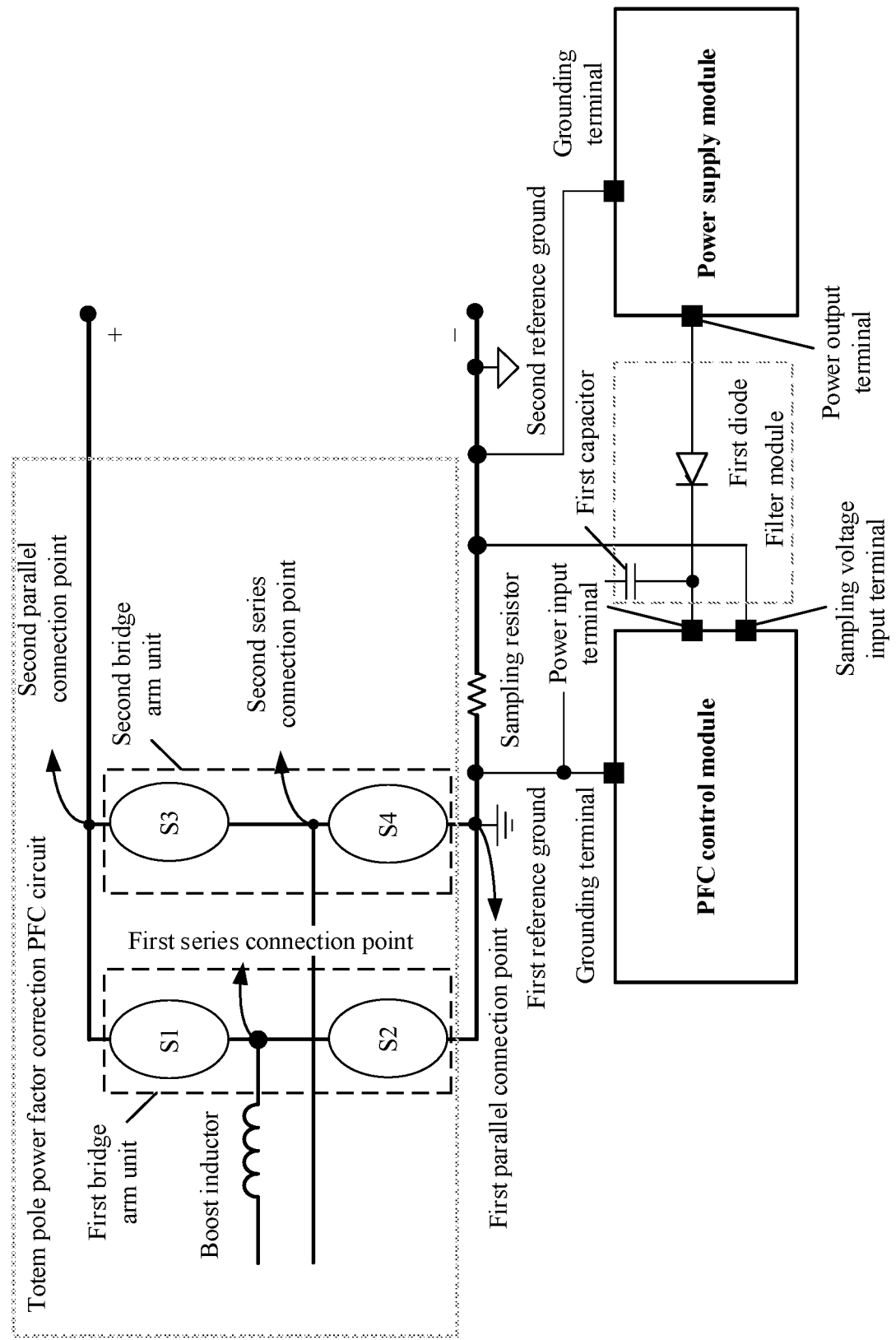
FIG. 6 is a schematic diagram of another structure of a high power factor rectifier circuit according to this disclosure.

Optionally, the filter may further include the first diode and a capacitor (for ease of description, the following uses a first capacitor as an example for description). While filtering a power supply input of the PFC controller and providing a transient current for the PFC controller, the first capacitor can control duration of a current flowing through the power supply loop. Proper disposition of the capacitor can ensure accuracy of current sampling. Generally, a to-be-set capacitance value of the first capacitor may be determined based on a power consumption capability of the PFC controller. For example, if the PFC controller has high power consumption, the capacitance value of the first capacitor needs to be set large. Otherwise, the capacitor cannot maintain a voltage between two ends of the capacitor, and a period of time during which a current flows through the power supply loop increases. If the PFC controller has low power consumption, the capacitance value of the first capacitor may be relatively set small, and setting of the capacitance value may be determined based on an actual application scenario. This is not limited herein. Further, FIG. 6 is a schematic diagram of another structure of the high power factor rectifier circuit provided in this disclosure. As shown in FIG. 6, the positive electrode of the first diode is connected to the power output terminal of the power supply, and the negative electrode of the first diode is connected to the power input terminal of the PFC controller. One end of the first capacitor is connected to a reference ground of the PFC controller, and the other end of the first capacitor is connected to the power input terminal of the PFC controller. It should be understood that, a larger capacitance value of the first capacitor indicates a shorter period of time during which a current flows through the power supply loop in a normal operating state and a smaller impact of the power supply current on inductor current sampling.

Figure 7:
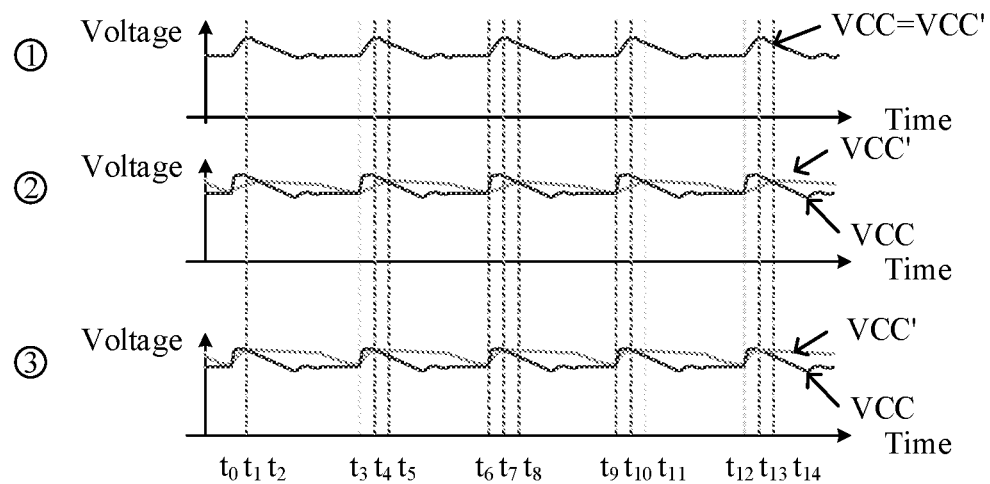
FIG. 7 is a schematic diagram of signal waveforms of an output voltage at a power output terminal of a power supply and an input voltage at a power input terminal of a PFC controller according to this disclosure.

For example, FIG. 7 is a schematic diagram of signal waveforms of an output voltage at the power output terminal of the power supply and an input voltage at the power input terminal of the PFC controller according to this disclosure. As shown in FIG. 7, when no filter is connected between the power output terminal of the power supply and the power input terminal of the PFC controller, that is, when the power output terminal of the power supply is directly connected to the power input terminal of the PFC controller by using a wire, signal waveforms of an output voltage VCC at the power output terminal of the power supply and an input voltage VCC' at the power input terminal of the PFC controller are shown as a signal waveform in a coordinate axis $\hat{1}$ of FIG. 7, where VCC=VCC'. It is not difficult to understand that the two voltages (namely, VCC and VCC') are voltages relative to the first reference ground. As shown in FIG. 5, after the filter including the first diode is connected between the power output terminal of the power supply and the power input terminal of the PFC controller, the signal waveforms of the VCC and the VCC' are shown in a coordinate axis $\hat{2}$ of FIG. 7. It is clear that, the signal waveform of the VCC' is flatter than the signal waveform of the VCC after the filter is added. As shown in FIG. 6, after the filter including the first diode and the first capacitor is connected between the power output terminal of the power supply and the power input terminal of the PFC controller, the signal waveforms of the VCC and the VCC' are shown in a coordinate axis $\hat{3}$ of FIG. 7. It is clear that, the signal waveform of the VCC' becomes flatter than the signal waveform of the VCC, and the filter including the first diode and the first capacitor has a shorter period of time during which a current flows through the power supply loop and a better effect than the filter including the first diode, that is, the signal waveform of the VCC' becomes flatter. It is not difficult to understand that because of the forward conductivity of the first diode, when and only when the VCC is greater than the VCC', a power supply current flows through a loop including the power supply, the PFC controller, and the sampling resistor. It can be learned from FIG. 7 that when the first diode is connected between the power output terminal of the power supply and the power input terminal of the PFC controller, only in the periods of time such as $t_0$ to $t_2$, $t_3$ to $t_5$, $t_7$ to $t_7$, $t_9$ to $t_{11}$, and $t_{12}$ to $t_{14}$ shown in FIG. 7, a power supply current of the power supply affects inductor current sampling. When the first diode and the first capacitor are connected between the power output terminal of the power supply and the power input terminal of the PFC controller, only in the periods of time such as $t_0$ to $t_1$, $t_3$ to $t_4$, $t_7$ to $t_7$, $t_9$ to $t_{10}$, and $t_{12}$ to $t_{13}$ shown in FIG. 7, the power supply current of the power supply affects the inductor current sampling. $\Delta t=|t_0-t_2|=|t_3-t_5|=|t_6-t_8|=|t_9-t_{11}|=|t_{12}-t_{14}|$, and $\Delta t'=|t_0-t_1|=|t_3-t_4|=|t_6-t_7|=|t_9-t_{10}|=|t_{12}-t_{13}|$. Because $\Delta t>\Delta t'$, compared with the filter including only the first diode, the filter including the first diode and the first capacitor has a shorter period of time during which the power supply current exists, that is, the power supply current has less impact on the inductor current sampling.

Figure 8:
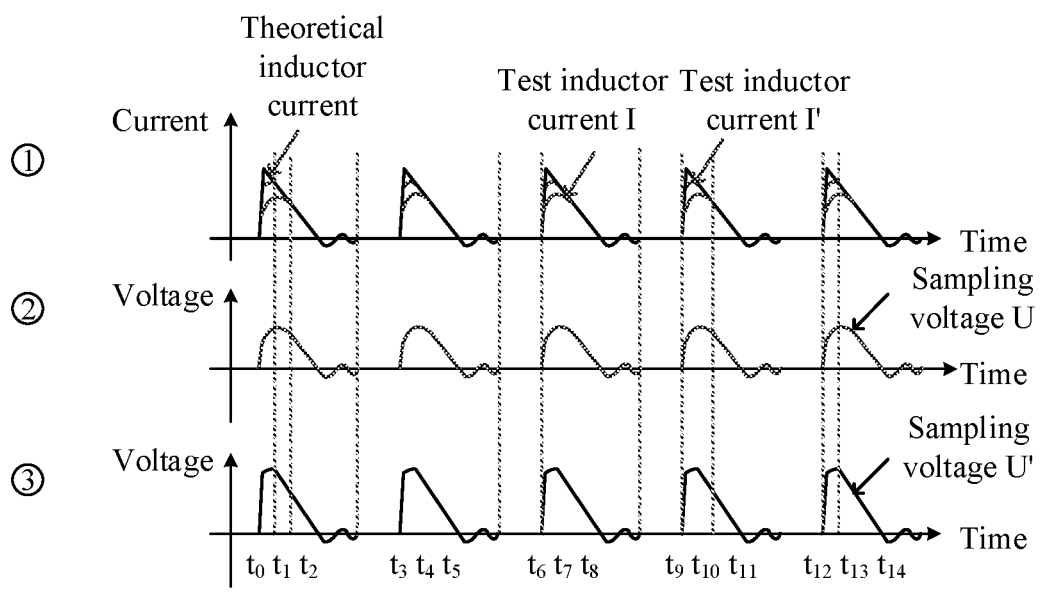
FIG. 8 is a schematic diagram of another inductor current sampling result when a high power factor rectifier circuit operates according to this disclosure.

Further, FIG. 8 is a schematic diagram of another inductor current sampling result when the high power factor rectifier circuit operates according to this disclosure. As shown in FIG. 8, signal waveform diagrams in a coordinate axis $\hat{1}$ respectively represent a current (namely, a theoretical inductor current) that flows through a sampling resistor when there is no impact of the power supply current at all in an ideal state, and a current (namely, a test inductor current) that flows through the sampling resistor and that is determined based on a sampling voltage when an impact of the power supply current exists in an actual sampling process. A test inductor current I is a current that actually flows through the sampling resistor and that is determined based on a sampling voltage U when the high power factor rectifier circuit shown in FIG. 5 operates. Correspondingly, signal waveform diagrams in the coordinate axis $\hat{2}$ are signal waveforms of the sampling voltage U that is fed back by the sampling resistor and that is at a sampling voltage input terminal of the PFC controller when the high power factor rectifier circuit shown in FIG. 5 operates. A test inductor current I' is a current that actually flows through the sampling resistor and that is determined based on a sampling voltage U' when the high power factor rectifier circuit shown in FIG. 6 operates. Correspondingly, signal waveform diagrams in a coordinate axis $\hat{3}$ are signal waveforms of the sampling voltage U' that is fed back by the sampling resistor and that is at the sampling voltage input terminal of the PFC controller when the high power factor rectifier circuit shown in FIG. 6 operates. It should be understood that the sampling voltage U in the coordinate axis $\hat{2}$ and the test inductor current I in the coordinate axis $\hat{1}$ meet the Ohm's law, that is, the test inductor current I=the sampling voltage U/a resistance value of the sampling resistor. The sampling voltage U' in the coordinate axis $\hat{3}$ and the test inductor current I' in the coordinate axis $\hat{1}$ also meet the Ohm's law, that is, the test inductor current I'=the sampling voltage U'/the resistance value of the sampling resistor. As shown in FIG. 8, because the filter is connected between the power output terminal of the power supply and the power input terminal of the PFC controller, the filter can effectively control a period of time during which a current flows through the power supply loop to further reduce an impact of the power supply current on inductor current sampling when the power supply and the sampling resistor are in a same loop. It can be learned from FIG. 8 that when only the first diode is connected between the power output terminal of the power supply and the power input terminal of the PFC controller, the power supply current of the power supply affects inductor current sampling in only the periods of time such as $t_0$ to $t_2$, $t_3$ to $t_5$, $t_6$ to $t_8$, $t_8$ to $t_{11}$, and $t_{12}$ to $t_{14}$. When the first diode and the first capacitor are connected between the power output terminal of the power supply and the power input terminal of the PFC controller, the power supply current of the power supply affects the inductor current sampling in only the periods of time such as $t_0$ to $t_1$, $t_3$ to $t_4$, $t_6$ to $t_7$, $t_8$ to $t_{10}$, and $t_{12}$ to $t_{13}$. $\Delta t=|t_0-t_2|=|t_3-t_5|=|t_6-t_8|=|t_9-t_{11}|=|t_{12}-t_{14}|$, and $\Delta t'=|t_0-t_1|=|t_3-t_4|=|t_6-t_7|=|t_9-t_{10}|=|t_{12}-t_{13}|$. Because $\Delta t>\Delta t'$, compared with the filter including only the first diode, the filter including the first diode and the first capacitor has a shorter period of time during which the power supply current exists, that is, the power supply current has less impact on the inductor current sampling.

Figure 9:
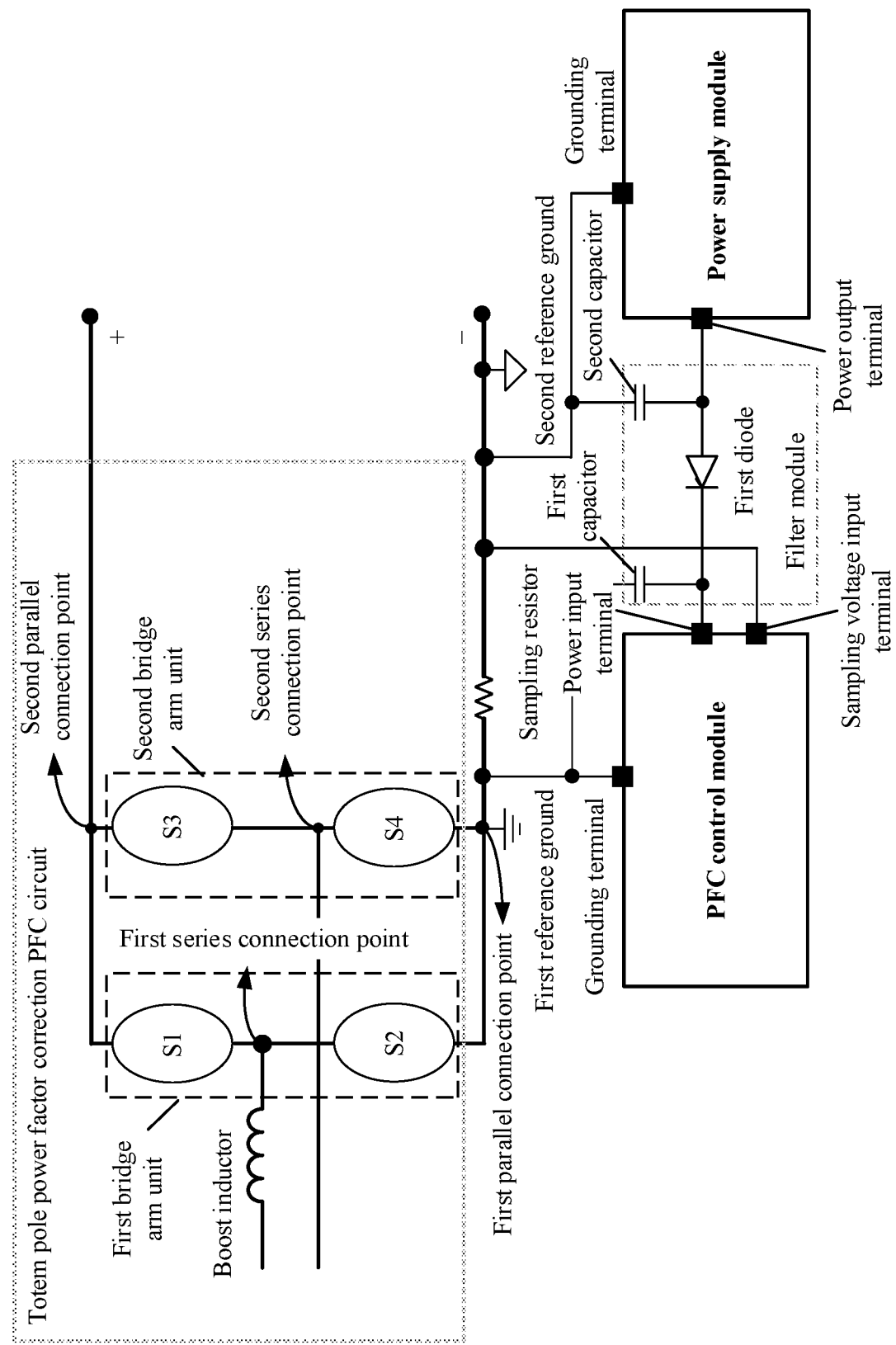
FIG. 9 is a schematic diagram of another structure of a high power factor rectifier circuit according to this disclosure.

Optionally, in addition to the first diode and the first capacitor, the filter may further include another capacitor (for ease of description, the following uses a second capacitor as an example for description). The second capacitor may filter out noise in an output voltage at the power output terminal of the power supply. Further, FIG. 9 is a schematic diagram of another structure of the high power factor rectifier circuit provided in this disclosure. As shown in FIG. 9, the filter includes the first diode, the first capacitor, and the second capacitor. The positive electrode of the first diode is connected to the power output terminal of the power supply, and the negative electrode of the first diode is connected to the power input terminal of the PFC controller. One end of the first capacitor is connected to a reference ground of the PFC controller, and the other end of the first capacitor is connected to the power input terminal of the PFC controller. One end of the second capacitor is connected to a reference ground of the power supply, and the other end of the second capacitor is connected to the power output terminal of the power supply.

In this disclosure, inductor current sampling is performed by using the sampling resistor, to reduce a volume of the circuit and reduce costs. Further, the filter is connected between the power output terminal of the power supply and the power input terminal of the PFC controller, and the filter can control a period of time during which a current flows through the power supply loop, thereby reducing an impact of coupling between the power supply loop and a sampling loop. In other words, the filter may control a period of time during which a current flows through the power supply loop, to limit mutual coupling between the power supply and a sampling circuit within this period of time. Therefore, an impact of the power supply current on inductor current sampling when the power supply and the sampling resistor are in a same loop is reduced, accuracy of inductor current sampling is improved, and further, the high power factor rectifier circuit can stably run. In addition, the filter is added to improve stability of an input voltage at the power input terminal of the PFC controller.

Figure 10:
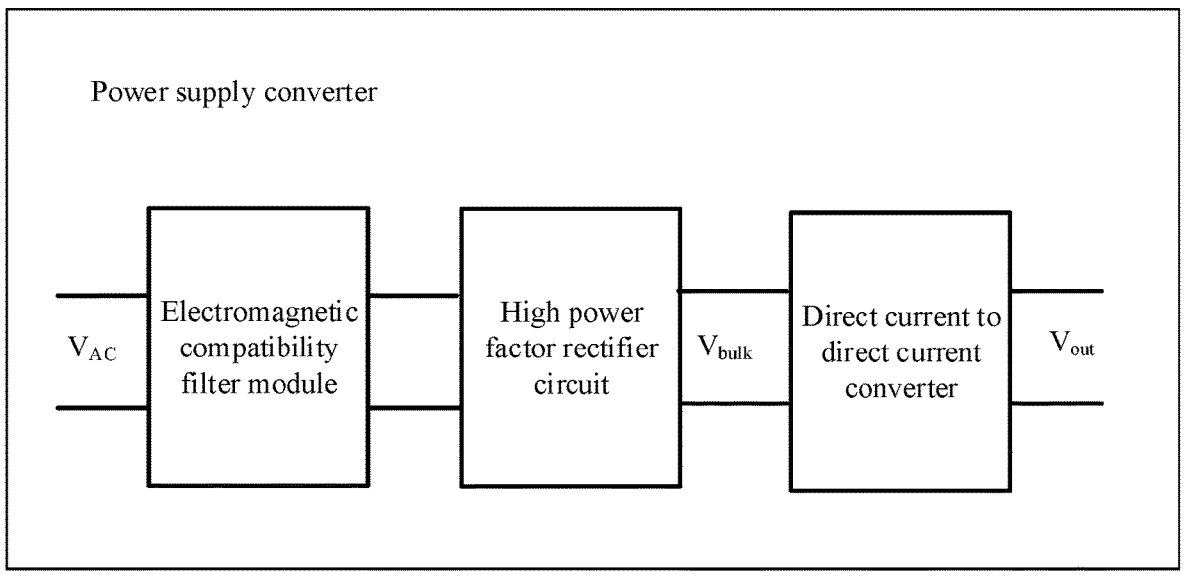
FIG. 10 is a schematic diagram of a structure of a power converter according to this disclosure.

Further, this disclosure provides a power converter. FIG. 10 is a schematic diagram of a structure of a power converter according to this disclosure. As shown in FIG. 10, the power converter includes the high power factor rectifier circuit and the DC/DC converter that are provided in this disclosure. An input terminal of the high power factor rectifier circuit is connected to an alternating current power supply $V_{AC}$, and an output terminal of the high power factor rectifier circuit is connected to an output terminal of the power converter by using the DC/DC converter. Optionally, the power converter may further include an electromagnetic compatibility (EMC) filter. The input terminal of the high power factor rectifier circuit is connected to the alternating current power supply $V_{AC}$ by using the EMC filter. It should be understood that the EMC filter may be configured to reduce electromagnetic interference in an alternating current, and the DC/DC converter may be configured to convert a high-voltage direct current bus voltage $V_{bulk}$ output by the high power factor rectifier circuit into a low-voltage direct current output voltage $V_{out}$. The DC/DC converter may include an isolated DC/DC converter, and a step-down ratio of the DC/DC converter is determined based on a voltage at the output terminal of the high power factor rectifier circuit and a voltage at the output terminal of the power converter. It is not difficult to understand that because the high power factor rectifier circuit has a characteristic of a small volume, the power converter provided in this disclosure also has a characteristic of a small volume. In addition, the high power factor rectifier circuit in this disclosure can operate more stably based on a more accurate sampling current, thereby further ensuring stable running of the entire power converter.

The foregoing descriptions are only specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A rectifier circuit, comprising:
   a first reference ground;
   a second reference ground;
   a filter comprising:
      a first diode having a positive electrode and a negative electrode;
      a first capacitor having a first capacitor end connected to the first reference ground and a second capacitor end; and
      a second capacitor having a third capacitor end connected to the second reference ground and a fourth capacitor end;
   a totem pole power factor correction (PFC) circuit comprising:
      a first parallel connection point connected to the first reference ground;
      a second parallel connection point;
      a first bridge arm unit; and
      a second bridge arm unit connected in parallel with the first bridge arm unit between the first parallel connection point and the second parallel connection point;
   a PFC controller comprising:
      a PFC controller grounding terminal connected to the first reference ground;
      a sampling voltage input terminal; and
      a power input terminal connected to the negative electrode and connected to the second capacitor end;
   a sampling resistor comprising:
      a first resistor end connected to the first parallel connection point; and
      a second resistor end separately connected to the sampling voltage input terminal and the second reference ground, wherein the PFC controller is configured to control the totem pole PFC circuit based on a sampling current flowing through the sampling resistor; and
   a power supply configured to supply power to the PFC controller and comprising:
      a power output terminal connected to the positive electrode, the fourth capacitor end, and the power input terminal using the filter; and
      a power supply grounding terminal connected to the second reference ground.

2. The rectifier circuit of claim 1, wherein the totem pole PFC circuit further comprises:
   a first series connection point;
   a second series connection point; and
   a boost inductor connected to the first series connection point,
   wherein the first bridge arm unit comprises a first switch and a second switch that are connected in series with the first series connection point in a same direction, and wherein the second bridge arm unit comprises a third switch and a fourth switch that are connected in series with the second series connection point in a same direction.

3. The rectifier circuit of claim 2, wherein the first switch and the second switch each comprise a metal-oxide-semiconductor field-effect transistor (MOSFET) or an insulated gate bipolar transistor (IGBT).

4. The rectifier circuit of claim 3, wherein the first switch, the second switch, the third switch, and the fourth switch are made of a silicon (Si) semiconductor material, silicon carbide (SiC), or gallium nitride (GaN) of a third generation wide-bandgap semiconductor material.

5. The rectifier circuit of claim 2, wherein the third switch and the fourth switch each comprise a MOSFET, an IGBT, or a diode.

6. The rectifier circuit of claim 1, wherein a rectifier circuit input terminal of the rectifier circuit is configured to connect to an alternating current power supply using an electromagnetic compatibility (EMC) filter, and wherein a rectifier circuit output terminal is configured to connect to a direct current to direct current (DC/DC) converter.

7. The rectifier circuit of claim 1, wherein the filter is configured to control a period of time during which a current flows through a power supply loop.

8. A power converter, comprising:
   a direct current to direct current (DC/DC) converter; and
   a rectifier circuit comprising:
      a first reference ground;
      a second reference ground;
      a filter comprising:
         a first diode having a positive electrode and a negative electrode;
         a first capacitor having a first capacitor end connected to the first reference ground and a second capacitor end; and
         a second capacitor having a third capacitor end connected to the second reference ground and a fourth capacitor end;
      a totem pole power factor correction (PFC) circuit comprising:
         a first parallel connection point connected to the first reference ground;
         a second parallel connection point;
         a first bridge arm unit; and
         a second bridge arm unit connected in parallel with the first bridge arm unit between the first parallel connection point and the second parallel connection point;
      a PFC controller comprising:
         a PFC controller grounding terminal connected to the first reference ground;
         a sampling voltage input terminal; and
         a power input terminal connected to the negative electrode and connected to the second capacitor end;
      a sampling resistor comprising:
         a first resistor end connected to the first parallel connection point; and
         a second resistor end separately connected to the sampling voltage input terminal and the second reference ground, wherein the PFC controller is configured to control the totem pole PFC circuit based on a sampling current flowing through the sampling resistor;

a power supply configured to supply power to the PFC controller and comprising:
   a power output terminal connected to the positive electrode, the fourth capacitor end, and the power input terminal using the filter; and
   a power supply grounding terminal connected to the second reference ground;
a rectifier circuit input terminal connected to an alternating current power supply; and
a rectifier circuit output terminal connected to a power converter output terminal of the power converter using the DC/DC converter.

9. The power converter of claim 8, wherein the power converter further comprises an electromagnetic compatibility (EMC) filter, and wherein the rectifier circuit input terminal is connected to the alternating current power supply using the EMC filter.

10. The power converter of claim 8, wherein the DC/DC converter is an isolated DC/DC converter, and wherein a step-down ratio of the DC/DC converter is based on a first voltage at the rectifier circuit output terminal and a second voltage at the power converter output terminal.

11. The power converter of claim 8, wherein the filter is configured to control a period of time during which a current flows through a power supply loop.

12. The power converter of claim 8, wherein the rectifier circuit input terminal is configured to connect to the alternating current power supply using an electromagnetic compatibility (EMC) filter.

13. The power converter of claim 8, wherein the totem pole PFC circuit further comprises:
   a first series connection point;
   a second series connection point; and
   a boost inductor connected to the first series connection point,
   wherein the first bridge arm unit comprises a first switch and a second switch that are connected in series with the first series connection point in a same direction, and
   wherein the second bridge arm unit comprises a third switch and a fourth switch that are connected in series with the second series connection point in a same direction.

14. The power converter of claim 13, wherein the first switch and the second switch each comprise a metal-oxide-semiconductor field-effect transistor (MOSFET) or an insulated gate bipolar transistor (IGBT).

15. The power converter of claim 13, wherein the third switch and the fourth switch each comprise an MOSFET, an IGBT, or a diode.

16. The power converter of claim 15, wherein the first switch, the second switch, the third switch, and the fourth switch are made of a silicon (Si) semiconductor material, silicon carbide (SiC), or gallium nitride (GaN) of a third generation wide-bandgap semiconductor material.

17. A power converter, comprising:
a direct current to direct current (DC/DC) converter; and
a rectifier circuit comprising:
   a first reference ground;
   a second reference ground;
   a filter;
   a totem pole power factor correction (PFC) circuit comprising:
      a first parallel connection point connected to the first reference ground;
      a second parallel connection point;
      a first bridge arm unit; and
      a second bridge arm unit connected in parallel with the first bridge arm unit between the first parallel connection point and the second parallel connection point;
   a PFC controller comprising:
      a PFC controller grounding terminal connected to the first reference ground;
      a sampling voltage input terminal; and
      a power input terminal;
   a sampling resistor comprising:
      a first resistor end connected to the first parallel connection point; and
      a second resistor end separately connected to the sampling voltage input terminal and the second reference ground, wherein the PFC controller is configured to control the totem pole PFC circuit based on a sampling current flowing through the sampling resistor;
   a power supply configured to supply power to the PFC controller and comprising:
      a power output terminal connected to the power input terminal using the filter; and
      a power supply grounding terminal connected to the second reference ground;
   a rectifier circuit input terminal connected to an alternating current power supply; and
   a rectifier circuit output terminal connected to a power converter output terminal of the power converter using the DC/DC converter,
   wherein the DC/DC converter is an isolated DC/DC converter, and wherein a step-down ratio of the DC/DC converter is based on a first voltage at the rectifier circuit output terminal and a second voltage at the power converter output terminal.

18. The power converter of claim 17, wherein the filter comprises a first diode having a positive electrode connected to the power output terminal and a negative electrode connected to the power input terminal.

19. The power converter of claim 18, wherein the filter further comprises a first capacitor having a first end connected to the first reference ground and a second end connected to the power input terminal.

20. The power converter of claim 19, wherein the filter further comprises a second capacitor having a third end connected to the second reference ground and a fourth end connected to the power output terminal.

* * * * *

UNITED STATES PATENT AND TRADEMARK OFFICE
CERTIFICATE OF CORRECTION

PATENT NO. : 12,424,932 B2  
APPLICATION NO. : 18/173416  
DATED : September 23, 2025  
INVENTOR(S) : Ken Chin et al.

Page 1 of 1

It is certified that error appears in the above-identified patent and that said Letters Patent is hereby corrected as shown below:

In the Claims

Claim 1, Column 11, Lines 50-51: "resistor; and" should read "resistor;"

Claim 17, Column 14, Lines 36: "current power supply; and" should read "current power supply;"

Signed and Sealed this  
Twenty-eighth Day of October, 2025

John A. Squires  
*Director of the United States Patent and Trademark Office*